United States Patent [19]
Haas

[11] Patent Number: 5,309,262
[45] Date of Patent: May 3, 1994

[54] OPTICALLY ADDRESSED LIGHT VALVE SYSTEM WITH TWO DIELECTRIC MIRRORS SEPARATED BY A LIGHT SEPARATING ELEMENT

[75] Inventor: Werner E. Haas, Webster, N.Y.

[73] Assignee: Xerox Corporation, Stamford, Conn.

[21] Appl. No.: 995,730

[22] Filed: Dec. 23, 1992

[51] Int. Cl.[5] .................... G02F 1/1335; G02F 1/135
[52] U.S. Cl. ...................................... 359/67; 359/71; 359/72
[58] Field of Search ................. 359/72, 71, 66, 67

[56] References Cited

U.S. PATENT DOCUMENTS

| | | | |
|---|---|---|---|
| 3,824,002 | 7/1974 | Beard | 359/72 |
| 3,976,361 | 8/1976 | Fraas et al. | 359/72 |
| 4,012,119 | 3/1977 | Adams et al. | 359/72 |
| 4,019,807 | 4/1977 | Boswell et al. | 359/72 |
| 4,032,954 | 6/1977 | Grinberg et al. | 359/72 |
| 4,037,932 | 7/1977 | Haas et al. | 359/72 |
| 4,114,991 | 9/1978 | Bleha, Jr. et al. | 359/72 |
| 4,127,322 | 11/1978 | Jacobson et al. | 353/31 |
| 4,389,096 | 6/1983 | Hori et al. | 359/72 |
| 4,500,174 | 2/1985 | Conner | 350/357 |
| 4,672,014 | 6/1987 | Joiner et al. | 430/20 |
| 4,752,820 | 6/1988 | Kuroiwa et al. | 365/108 |
| 4,799,773 | 1/1989 | Sterling | 359/72 |
| 4,925,276 | 5/1990 | McMurray, Jr. et al. | 359/72 |
| 5,084,777 | 1/1992 | Slobodin | 359/67 |
| 5,142,391 | 8/1992 | Fujiwara et al. | 359/72 |
| 5,153,759 | 10/1992 | Haas et al. | 359/67 |

OTHER PUBLICATIONS

W. E. Haas, "Liquid Crystal Display Research: The First Fifteen Years", Mol. Cryst. Liq. Cryst., vol. 94, (1983), pp. 1-31.
B. Kerllenevich et al., "New Simple Model of a Liquid Crystal Light Valve," Mol. Cryst. Liq. Cryst., vol. 70, (1981), pp. 95-104.
T. D. Beard et al. "AC Liquid-Crystal Light Valve", Applied Physics Letters, vol. 22, No. 3, (Feb., 1973), pp. 90-92.
L. Samuelson et al., "Fast photoconductor coupled liquid-crystal light valve", Appl. Phys. Lett., vol. 34, No. 7, (Apr. 1979), pp. 450-452.
L. R. Basyaeva et al., "Optically controlled transparency having a structure consisting of a vitreous chalcogenide photoconductor and a liquid crystal", Sov. J. Opt. Technol., vol. 49, No. 11, (Nov., 1982), pp. 688-691.
U. Efron et al., "Silicon liquid crystal light valves: status and issues", Optical Engineering, vol. 26, No. 6, (Nov.-Dec., 1983), pp. 682-686.
J. M. Pollack et al., "A Low-Noise Image Amplifier", SID Digest, (May, 1976), pp. 142-143.

*Primary Examiner*—Anita P. Gross

[57] ABSTRACT

A light valve comprising a first transparent electrically insulating layer, a first transparent electrically conductive layer, an electro-optic imaging medium layer, a first dielectric mirror, a light separating layer comprising an organic dye, organic pigment, or a semiconductor selected from the group consisting of As, Se, Te, Bi, Sb, Fe, Si, S or alloys thereof, a second dielectric mirror layer, a photoconductor layer, a second transparent electrically conductive layer and a second transparent layer. This light valve may be utilized in systems which include an imaging light source and a read-out light source.

18 Claims, 1 Drawing Sheet

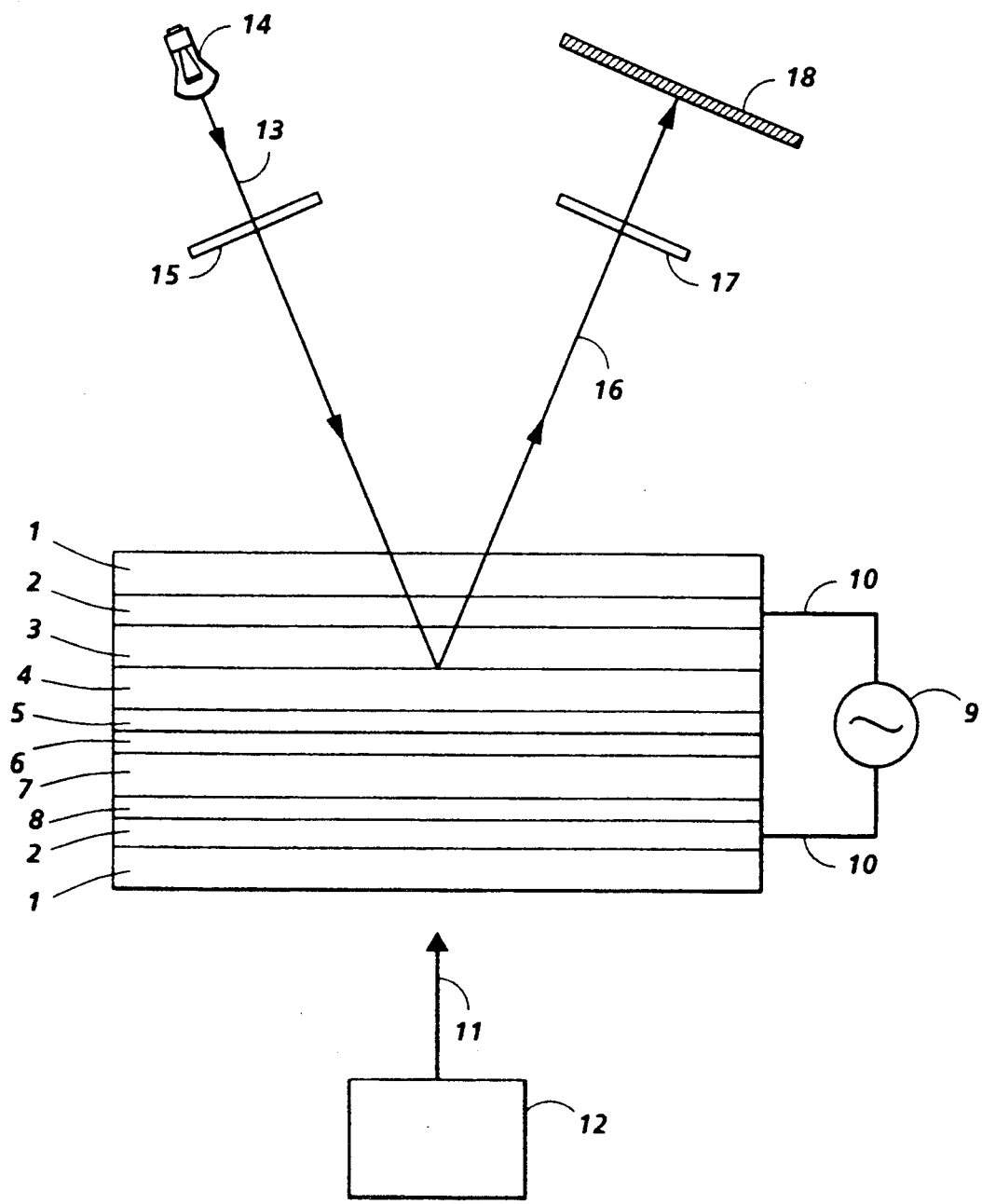

OPTICALLY ADDRESSED LIGHT VALVE SYSTEM WITH TWO DIELECTRIC MIRRORS SEPARATED BY A LIGHT SEPARATING ELEMENT

BACKGROUND OF THE INVENTION

This invention relates in general to optically addressed light valve systems and more specifically to real-time reflective light valve systems and processes for using the light valves.

With the advances in imaging process techniques, various types of optically addressed light valves are now practical. Desirably, such light valves should permit read-out during the write-in cycle. The intensity of the read-out light should exceed the write-in intensity, which preferably is small, by many orders of magnitude.

Many types of light valves are described in the patent and scientific literature. In general, such light valves comprise a photoconductive layer in series with an electro-optic layer such as a liquid crystal layer, ferroelectric layer or the like. The photoconductive layer is placed under an electrical bias and light imagewise incident on it effectively causes its electrical resistance to decrease in the exposed areas. This results in imagewise changes in the electric field across the electro-optic layer which in turn can be read out or projected. Optically addressed light valves based on photoconductor controlled liquid crystal layers offer many attractive features such as high light sensitivity, excellent resolution, small power consumption and low cost.

It has heretofore been accepted that prevention of image washout by the read-out light would require either read-out with light of wavelengths to which the photoconductor is insensitive or, alternately, insertion of an optical blocking layer between the electro-optic medium and photoconductor. Both alternatives are discussed in the literature. In an article entitled "AC Liquid-Crystal Light Valve" by T. D. Beard, W. P. Bleha and S. Y. Wong which appeared in Applied Physics Letters of Feb. 1, 1973, cadmium sulfide is used as the photoconductor, and a light crystal as the electro-optic medium. To separate the write-in light from the read-out light, an optical blocking layer of cadmium telluride is used in conjunction with a dielectric mirror. Similarly, in U.S. Pat. No. 3,824,002, a cadmium telluride layer is used to block light that could discharge a cadmium sulfide photoconductor. Although cadmium telluride blocks out visible light, including red light, it may form a heterojunction with the underlying photoconductor which may cause problems of an electrical nature. Furthermore, cadmium telluride is difficult to deposit.

Although excellent imaging may be obtained with optically addressed light valves, read-out of photoconductor layers such as $AS_2Se_3$ require a cut-off filter for the read-out light which allows transmission of only wavelengths below about 6,000 angstroms (e.g. see U.S. Pat. No. 4,037,932 and "Ultralow-voltage image intensifiers", by Haas et al, Applied Physics Letters of Nov. 15, 1976). It has been found that for color images, the spectrum of the read-out light that strikes the mirror must be of a broad spectrum in order to produce an amplified color image having true red hues. As is known in the art, color images are formed by using two or more light valves and combining colors, e.g. see U.S. Pat. No. 4,127,322, the entire disclosure of this patent being incorporated herein by reference. Thus, for true color read-out images it is essential that the red region of the spectrum not be filtered out from the read-out light before it reaches the light valve. If the red region of the spectrum is filtered from the read-out light before it reaches the light valve, the final reflected image takes on an undesirable orange-red appearance in the regions where it should appear red. If the red region of the spectrum of the read-out light passes through the photoconductor layer and the photoconductor layer is sensitive to red (e.g. photoreceptor contains arsenic and selenium), the final reflected image takes on a washed out appearance. Therefore, when photoconductor layers sensitive to red are employed in light valves, red light (e.g. light having a wavelength between about 6,000 angstroms and about 7,000 angstroms) erases the image on the photoconductor layer unless a filter is used on the read-out light or an effective mirror and/or blocking layer are employed.

In new and growing areas of this technology, new methods, apparatus, compositions and articles of manufacture are often discovered for the application of the new technology in new modes.

INFORMATION DISCLOSURE STATEMENT

U.S. Pat. No. 5,084,777 to Slobodin, issued Jan. 28, 1992—A light addressed liquid crystal light valve incorporating electrically insulating light blocking material is disclosed. The light-valve has a hydrogenated amorphous silicon photosensitive layer and a germanium containing or tin containing alloy film as a light blocking layer. The light blocking layer that may be used is a selected alloy which includes one or more elements from the group consisting of germanium and tin, one or more elements from the group consisting of hydrogen, nitrogen and oxygen, and zero or more elements from the group consisting of silicon and carbon. The light blocking layer has an optical density per unit thickness approximately equal to or greater than 3 OD/micron for visible light and a sheet resistivity approximately equal to or greater than $10^{10}$ ohms/square.

U.S. Pat. No. 5,153,759 to Haas et al, issued Oct. 6, 1992—A light valve is disclosed comprising a first transparent electrically insulating layer, a first transparent electrically conductive layer, an electro-optic imaging medium layer, a dielectric mirror, a separating layer comprising an organic dye, organic pigments, a photoconductor layer, a second transparent electrically conductive layer and a second transparent layer. This light valve may be utilized in systems which include an imaging light source and a read-out light source.

U.S. Pat. No. 3,824,002 issued to on 19—A photoactivated liquid crystal light valve or cell is disclosed in which all electrically conductive elements of the light valve are separated from the liquid crystal layer by insulating layers. By thus separating all electrically conductive elements from direct contact with the liquid crystal layer, the life of the liquid crystal is significantly extended. To accomplish photoactivation in the presence of electrical insulating layers, the principle of impedance matching is applied to the photoconductor/liquid crystal combination. Three novel means of impedance matching are taught: 1) photoresponsive heterojunction; 2) low impedance liquid crystal; 3) metal grid.

U.S. Pat. No. 4,672,014 to Charles W. Joiner et al., issued Jun. 9, 1987—A method and apparatus are disclosed for exposing an imaging sheet to form a latent image in a layer of photosensitive microcapsules on the surface of the imaging sheet utilizes wavelength or frequency transformation of light images representative of the latent image, which transformation is performed by a light valve. An original document, including images which are to be transferred to an imaging sheet, is illuminated by visible light which is directed upon and controls the light valve, such that actinic radiation illuminating the light valve is modulated in accordance with the visible light; the modulated actinic radiation is directed upon the imaging sheet to form a latent image therein. In this way, the original document may be illuminated by visible light which is effectively wavelength or frequency transformed by the light valve into actinic radiation, typically in the ultraviolet range.

U.S. Pat. No. 4,019,807 to Donald D. Boswell et al., issued Apr. 26, 1997—There is disclosed a high performance reflective mode liquid crystal light valve suitable for general image processing and projection and particularly suited for application to real-time coherent optical data processing. A preferred example of the device uses a CdS photoconductor, a CdTe light absorbing layer, a dielectric mirror, and a liquid crystal layer sandwiched between indium-tin-oxide transparent electrodes deposited on optical quality glass flats. The non-coherent light image is directed onto the photoconductor; this reduces the impedance of the photoconductor, thereby switching the AC voltage that is impressed across the electrodes onto the liquid crystal to activate the device. The liquid crystal is operated in a hybrid field effect mode. It utilizes the twisted nematic effect to create a dark off-state (voltage off the liquid crystal) and the optical birefringence effect to create the bright on-state. The liquid crystal thus modulates the polarization of the coherent read-out or projection light responsively to the non-coherent image.

U.S. Pat. No. 4,114,991 to William P. Bleha, Jr., et al, issued Sep. 19, 1978—There is disclosed a reflective type liquid crystal light valve means for converting a visible wavelength dynamic image to an infrared wavelength dynamic image. The device employs an infrared reflecting and visible transmitting indium-tin-oxide film which is external to the liquid crystal layer and active films and which also serves as a conductive electrode for the device. In operation, a visible image is transmitted through a visible transmitting faceplate and through this ITO film to a photosensor to modify its impedance. An infrared projection beam is transmitted through a second infrared transmissive faceplate, through the liquid crystal means and the photosensor to the IR reflective dichroic film and thence back through the rest of the liquid crystal cell for projection.

U.S. Pat. No. 4,032,954 to Jan Grinberg et al, issued Jun. 28, 1977—There is disclosed a silver doped silicon single crystal charge storage photodiode substrate suitable for use in an alternating current driven liquid crystal light valve. The gain capability of the charge storage photodiode makes it possible to construct a single crystal substrate ac light valve very similar in structure to that presently being used with a cadmium sulphide photodiode, but having improved operating characteristics and benefitting from a more fully developed manufacturing technology for silicon devices. One specific embodiment of such a single crystal substrate is a silicon substrate doped with a slow recombination center element such as silver.

U.S. Pat. No. 4,012,119 to James E. Adams et al., issued Mar. 15, 1977—A direct current liquid crystal display device is disclosed for reflection viewing comprising a dielectric mirror having at least one pair of titanium dioxide and silicon dioxide layers, the titanium dioxide layer being in contact with a layer of liquid crystalline composition, between two electrodes.

U.S. Pat. No. 4,925,276 to Robert E. McMurray, Jr., et al., issued May 15, 1990—A liquid crystal light valve is disclosed which comprises a pair of glass cover plates. Transparent electrodes are located on the interfaces of each cover plate. The electrodes are electrically connected to alternating current sources. Insulating films are placed on either side of a liquid crystal material to provide electrical and chemical isolation between the liquid crystal and the electrodes. Spacers are employed to maintain a suitable gap between the insulating films and to prevent the liquid crystal from escaping. Positioned on the side of the liquid crystal from which writing light enters the light valve are, respectively, a dielectric mirror, a light blocking layer and a photoactive layer. According to the present invention, the photoactive layer comprises hydrogenated amorphous silicon which is configured as a photodiode with a junction layer facing the writing light.

U.S Pat. No. 3,976,361 to Lewis M. Fraas et al, issued Aug. 24, 1976—In a light actuated device such as an alternating current driven light valve or other display device requiring the photocapacitance of a light responsive layer in a photodiode to be modulated in response to changes in incident or writing light, sensitivity is an important factor, especially when a cathode ray tube phosphor image is the source of such light. This sensitivity can be improved by more than an order of magnitude by using a graded defect center concentration, graded band gap layer in said diode which can produce a graded optical absorption coefficient between two regions of the layer so that most of the incident light is absorbed in the region near the semiconductor rectifying junction of the diode to store charge near this junction by this or any similar action. In one particular embodiment disclosed a cadmium sulfide photoconductor is used and the defect center density and hence the optical absorption coefficient for the incident light beam in the light sensitive region is graded from a low value on the light input side to a higher value near the junction forming interface with a cadmium telluride light blocking layer by varying the defect concentration in the cadmium sulfide during the film preparation by progressively lowering the temperature during sputter deposition. In a second embodiment this grading is accomplished by alloying cadmium sulfide with cadmium selenide near the cadmium telluride region thus introducing defect centers and lowering the absorption band edge. In both embodiments charge carriers are generated which are stored in the region adjacent to the junction interface and thereby change the photocapacitive depletion width adjacent to the junction to enhance the sensitivity of the diode.

U.S. Pat. 4,752,820 to Kuroiwa et al, issued Jun. 21, 1988—An optical recording medium is disclosed comprising (1) a first substrate having thereon an electrode layer such as a light absorbing electrode layer and (2) a second transparent substrate having thereon a transparent electrode layer. A recording layer of liquid crystal is located between the electrode layer and the transparent electrode layer. The recording medium further comprises radiation absorbing means to provide a change of directional orientation of the liquid crystal. The light absorbing electrode layer may comprise phthalocyanine. See column 2, lines 56-59. The phthalocyanine may be coordinated with a central atom such as vanadyl. See column 3, lines 13-18. The light absorbing layer of phthalocyanine may be applied by any suitable technique such as evaporation, sputtering, or coating. The substrate may include glass and transparent resins. The transparent electrode layer may comprise various metals such as indium oxide, indium tin oxide, and tin oxide.

U.S. Pat. No. 4,799,773 to Sterling, issued Jan. 24, 1989—A liquid crystal light valve is disclosed comprising a glass substrate, an indium tin oxide layer, a silicon photoconductor layer, a Si bonding structure, a cadmium telluride blocking layer, a $SiO_2$ layer, a titanium dioxide/silicon dioxide mirror, an insulator layer and liquid crystal layer as known in the prior art.

U.S. Pat. No. 4,389,096 to Hori et al, issued Jun 21, 1983—A liquid crystal light valve is disclosed comprising a cadmium telluride blocking layer on a cadmium sulfide photoconductor layer.

U.S. Pat. No. 4,127,322 to Jacobson et al, issued Nov. 28, 1978—An electro-optical system is disclosed which utilizes a light valve comprising a transparent layer; a transparent conductive layer such as indium tin oxide; a photoconductor layer such as as cadmium sulfide, selenium and zinc telluride, etc.; a blocking layer such as cadmium telluride, a multilayer dielectric mirror; an electrode; and a transparent layer.

U.S. Pat. No. 3,824,002 to Beard, issued Jul. 16, 1974—A photoactivated liquid crystal light valve is disclosed which comprises a reflective coating, a transparent color layer, a tin doped indium oxide layer, an insulating layer, a liquid crystal layer, an insulating layer, a dielectric mirror layer, a light blocking layer such as cadmium telluride, a cadmium sulfide photoconductor, a conductive layer and a transparent layer.

U.S. Pat. No. 4,037,932 to Haas et al, issued Jul 26, 1977—An optically addressed light valve is disclosed which is capable of being read out at very high light intensities during the write-in cycle without need for an optical blocking layer.

W. E. Haas, Mol. Cryst. Liq. Cryst., 94, 1-31 (1983)—A review of the liquid crystal display field is disclosed including a description on pages 23-35 of the combination of photoconductors and liquid crystals in light valves.

B. Kerllenevich et al, Mol. Cryst. Liq. Cryst., 70, 95-104 (1981)—A liquid crystal light valve is described which includes the combination of a liquid crystal layer and photoconductive layer. A CdS photoconductive film and CdTe layer combination is disclosed. Also, selenium (or $As_2Se_3$) is described as being sensitive at wavelengths shorter than 0.56 micrometers (5,600 angstroms) and being possible photoconductors having a convenient absorption coefficient to reduce sufficiently the intensity of the actinic components of the read-out light with respect to that of the write-in light.

T. D. Beard et al, "AC Liquid-Crystal Light Valve", Applied Physics Letters of Feb. 1, 1973—A liquid-crystal light valve is disclosed in which cadmium sulfide is used as the photoconductor and a liquid crystal as the electro-optic medium. To separate the write-in light from the read-out light, an optical blocking layer of cadmium telluride is used in conjunction with a dielectric mirror.

L. Samuelson et al., Appl. Phys. Lett. 34, 450-452 (April 1979)—Spots on liquid crystals are switched by exposure to pulses of laser light on the liquid crystal through a coupled photoconductive film of glow-discharged-produced amorphous Si.

L. R. Basyaeva et al, Sov. J. Opt. Technol. 49, 688-691 (November, 1982)—An optically controlled transparency is described in which a layer of vitreous As-Se chalcogenide photoconductor is used as the photolayer. The device includes a glass layer, a transparent conducting layer, orienting layer, liquid crystal layer, photoconductor layer, transparent conducting layer, and glass layers.

U. Efron et al., Optical Engineering, 22, 6, 682-686 (November-December, 1983)—The structure, operation and performance of silicon based liquid crystal light valves-the photoactivated, CCD-addressed, and visible-to-IR converter are described.

J. M. Pollack et al, SID 76 Digest, 142-143 (May 1976)—A low-noise image amplifier is disclosed comprising a glass layer, an indium oxide layer, a silicon monoxide layer, a liquid crystal layer, a silicon monoxide layer, a dielectric mirror, a photoconductor layer, an indium oxide layer, and a glass layer.

Thus, there is a continuing need for light valves which produce improved amplified color images having true red hues.

SUMMARY OF THE INVENTION

It is, therefore, an object of the present invention to provide a novel light valve which overcomes the above-noted deficiencies.

It is another object of the present invention to provide an improved light valve which produces improved amplified color images having true red hues.

It is still another object of the present invention to provide an improved light valve having red sensitive photoconductive layers usable with broad spectrum read-out lights.

It is yet another object of the present invention to provide an improved light valve which uses a light separating layer sandwiched between two dielectric mirrors.

It is still another object of the present invention to provide an improved light valve which uses two dielectric mirrors sandwiching a layer of As, Se, Te, Bi, Sb, Ge, Si, S or alloys thereof as a separating element.

It is yet another object of the present invention to provide an improved light valve which high reflectivity.

It is still another object of the present invention to provide an improved light valve having an optical isolator which prevents interaction between read-out and address lights.

The foregoing objects and others are accomplished in accordance with this invention by providing a light valve comprising a first transparent electrically insulating layer, a first transparent electrically conductive layer, an electro-optic imaging medium layer, a dielectric mirror, a light separating layer comprising an organic dye, organic pigment, or semiconductor layer selected from the group consisting of As, Se, Te, Bi, Sb, Ge, Si, S and alloys thereof, a second dielectric mirror, a photoconductor layer, a second transparent electrically conductive layer and a second transparent layer. This light valve may be utilized in a device which includes an imaging light source and a read-out light source.

The light valve device can be operated either with DC or AC bias. In the dark, the photoconductor layer is highly electrically resistive and the electrical field applied across the sandwich drops essentially across the photoconductor layer. The imaging layer medium in turn responds to the imagewise modulated electric field to produce a viewable image. If actinic components of the read-out light should reach the surface of the photoconductor layer, the resistance of the entire photoconductor layer drops and washout of the readout image occurs. In other words, actinic components of the read-out light should not reach the surface of the photoconductor layer. If actinic light from the readout source should reach the photoconductor it would generate carriers just as the imaging light does. For this reason, it is desirable that the optical absorption of the light separating layer combined with the reflectivity of the first and second dielectric mirrors be sufficient to reduce the intensity of the actinic components of the readout light to at least about 10 percent of the intensity of the write-in light.

BRIEF DESCRIPTION OF THE DRAWINGS

A more complete understanding of the process of the present invention can be obtained by reference to the accompanying drawing wherein the FIGURE is a schematic illustration of a cross sectional segment of a light valve. This FIGURE merely schematically illustrates the invention and is not intended to indicate relative size and dimensions of components thereof.

DETAILED DESCRIPTION OF THE DRAWINGS

Referring to the FIGURE, a cross section of a light valve of this invention is shown which comprises transparent layers 1, each coated with a substantially transparent electrically conductive layer 2. Adjacent to one of the transparent electrically conductive layers 2, is an electro-optic imaging medium layer 3 comprising, for example, liquid crystals or ferroelectrics material. Next is a first dielectric mirror 4 comprising multiple dielectric layers of reflective materials. A light separating layer 5 comprising an organic dye, organic pigment or a semiconductor layer selected from the group consisting of As, Se, Te, Bi, Sb, Ge, Si, S and alloys thereof is sandwiched between first dielectric mirror 4 and second dielectric mirror 6. Adjacent to second dielectric mirror 6 is photoconductor layer 7. An optional polymeric adhesive layer 8 enhances adhesion of photoconductive layer 7 to substantially transparent electrically conductive layer 2. An electric field is created between the two electrically conductive layers 2 by an external circuit which typically comprises a source of electrical potential 9 which is connected across the electrically conductive layers 2 through suitable electrical leads 10. The source of electrical potential may be either DC, AC, DC biased AC, sine wave, square wave, sawtooth, or a combination thereof. Photoconductor layer 7 is exposed to imaging light 11 to which it is sensitive. The imaging light 11 is produced by a conventional imaging light source 12 such as, for example, a cathode ray tube, a scanned laser beam, a light emitting diode array (LED), a scanned LED, an electroluminescent display, and the like with any suitable coupling means such as an lens, fiber optics, gradient index layer, and the like. Read-out light 13 emitted from a conventional broad spectrum read-out light source 14 is directed through a polarizer 15 onto the light valve. Most of the read-out light 13 which penetrates transparent layer 1, transparent electrically conductive layer 2 and electro-optic imaging medium layer 3 to reach first dielectric mirror 4 is reflected by first dielectric mirror 4 back through electro-optic imaging medium layer 3, transparent electrically conductive layer 2 and transparent layer 1. The reflected read-out light 16 is directed through an analyzer 17 onto viewing screen 18. Although the polarizer 15 and analyzer 17 are illustrated in the FIGURE as separate units, their functions may be combined into a single unit in the form of a single beam splitting polarizer as is well known in the art. Even with weak imaging light energies the image can be viewed or read out at very high broad spectrum read-out light intensities. This is due to the reflective and absorption characteristics of the mirror and organic dye or pigment separating layer.

An important embodiment of the present invention is that real time imaging and projection can be readily achieved using broad spectrum light illumination. In real time imaging and projection, light valves are read out during the write-in step. For example, television projection can conveniently and easily be achieved by using (referring now to the FIGURE) an imaging light source 12 comprising a conventional lens which optically focuses the image from a television receiver onto the light valve. Also, for example, in addition to use as a projection display, the present invention can be utilized as a light intensifier to intensify an original image for imaging xerographic plates, photographic film, and the like. It could also be employed, for example, as an image converter to convert incoherent light images to coherent light images and the like.

In the light valve described with reference to the FIGURE, the transparent layers 1 may comprise any suitable transparent material. Typical conventional transparent materials include, for example, glass, plastic and the like.

The conductive layers 2 shown in the FIGURE may comprise any suitable substantially transparent electrically conductive material. Typical conventional, transparent, conductive electrodes include substantially transparent and continuous conductive coatings of electrical conductors such as tin, tin oxide, indium oxide, indium tin oxide, aluminum, chromium, and the like. These substantially transparent conductive layers are typically evaporated or sputtered onto the more electrically insulating, transparent layer 1. NESA glass, a tin oxide coated glass manufactured by the Pittsburgh Plate Glass Company, is a commercially available example of a typical substantially transparent conductive layer supported by a transparent layer. Transparent electrically conductive layers of indium tin oxide are preferred because they are easily formed, have excellent electrical conductivity and absorb little or no radiation.

The electro-optic imaging medium layer 3 illustrated in the FIGURE may comprise any suitable liquid crystal or ferroelectric material which satisfies the requirements for the electro-optic imaging medium. Thus, the electro-optical properties of the imaging medium should be suitable for modulating the read-out light. Modulation may utilize the birefrigence effect in nematic liquid crystals, the cholesteric-nematic phase the "supertwist" nematic liquid crystal effect, polymer encapsulated liquid crystals and the like. Typical liquid crystal materials include cholesteric, nematic, and smectic materials. A typical thickness for a liquid crystal imaging medium layer is between about 0.1 micrometer and about 20 micrometers. Preferably, the thickness is between about 3 micrometers and about 7 micrometers. Generally, thinner liquid crystal layers provide a faster response, but provide less contrast. Electro-optic imaging media include ceramics, ferroelectric single crystals and Pockel's crystals. Ferroelectric liquid crystal electro-optic effects are well known in the art.

A number of liquid crystal electro-optic effects can be exploited for operation of reflective light valves. One example of such electro-optic effects is the cholesteric-nematic phase transition described in U.S. Pat. No. 3,718,380 to Wysocki, et al, the entire disclosure of this patent being incorporated herein by reference. A scattering cholesteric liquid crystal electro-optic imaging medium layer becomes clear upon application of an electric field of sufficient strength and returns to the scattering state after field removal. Typical liquid crystal mixtures exhibiting this effect have their molecules arranged in the helical fashion of cholesterics and possess overall positive dielectric anisotropy. The optical contrast between transformed and nontransformed regions is sufficient for direct viewing but can be further enhanced by polarizing optics.

A preferred liquid crystal electro-optic effect suitable for exploitation in the electro-optic mask or imaging medium layer of the light valve of the instant invention is based on the liquid crystal twisted nematic effect described by M. Schadt and W. Helfrich in Applied Physics Letters of Feb. 15, 1971, the entire disclosure thereof being incorporated herein by reference. Nematic liquid crystals of overall positive dielectric anisotropy are forced mechanically into a helical arrangement which is broken up by an applied electric field. The effect is analogous to the cholesteric-nematic phase transition; after field removal the molecules return to the helical arrangement. Since both states are non-scattering, polarizing aids are required to generate a viewable image. In the liquid crystal twisted nematic effect, the liquid crystal device is transparent prior to application of an electric field, becoming opaque after application of an electric field. The device described by Schadt and Helfrich, however, can also be operated in a reversed mode in which the layer is opaque prior to application of an electric field and transmissive after application of the of the electric field. In the first case, the two polarizers, which are part of the liquid crystal device are crossed, and in the second case, they are parallel.

A still further liquid crystal effect suitable for exploitation in the electro-optic imaging medium layer of the light valve of the present invention is the so-called "dynamic scattering" effect described by G. H. Heilmeier, L. A. Zanoni and L. A. Barton in the Proceedings of the IEEE of July, 1968, the entire disclosure thereof being incorporated herein by reference. In dynamic scattering, which occurs in nematic liquid crystals, current flow through a thin layer produces violent turbulence which ceases if the current flow stops. No polarizing aids are necessary with this effect. However, polarizing aids can be used to enhance contrast. Yet another liquid crystal effect which can be exploited is the so-called Freederick's transition in which initially aligned nematic molecules are tilted perpendicular to the electric field if they are dielectrically negative or parallel to the field if they are dielectrically positive. Polarizing aids are required to view the effect. Another electro-optic media which can be used are polymer encapsulated liquid crystals described by Fergason et al, SID Digest, May 1986, the entire disclosure thereof being incorporated herein by reference.

Ferroelectric ceramics are yet another electro-optic medium which can be used in the light valve of the present invention. In an article by Cecil E. Land and Philip D. Thacher in Proceedings of the IEEE of May, 1969 the applications of ferroelectric in electro-optics are discussed in detail and several electro-optic effects are discussed. The entire disclosure of this article is incorporated herein by reference. Electro-optic imaging medium layer 3 can be a ferroelectric ceramic layer. In yet a further embodiment, layer 3 can be a ferroelectric simple crystal as described, for example, by S. E. Cummings and T. H. Luke in IEEE Transactions on Electron Devices, Volume ED-18 September, 1971. The entire disclosure of this article is incorporated herein by reference. A simple crystal of ferroelectric bismuth titanate is utilized as an electro-optic medium. Single crystals exhibiting the Pockels effect are another class of electro-optic media suitable to function as layer 3. Pockels crystals may or may not be ferroelectric but all exhibit the so-called Pockels effect which is a linear change in birefringence with applied electric field. For a more detailed discussion, see for example, an article by D. H. Pritchard which appeared in RCA Review of December, 1969. The entire disclosure of this article is incorporated herein by reference.

In the light valve described with reference to the FIGURE, first dielectric mirror 4 and second dielectric mirror 6, may comprise any suitable broad band reflecting multilayered, dielectric mirror. Generally, the dielectric mirror 4 comprises numerous layers alternating between different low and high refractive index materials to form a total of, for example, between about 2 and about 70 layers. More typically, the mirrors comprise between about 35 and about 60 layers. These dielectric mirror layers comprise conventional dielectric mirror materials. The broad band mirror should reflect at least about 90 percent of the impinging light have a wavelength between about 4,500 and about 7,500 angstroms. The thickness of the mirror is not particularly critical. Typical materials employed in the dielectric mirror layer include, for example, zinc sulfide, cryolite (Na$_3$AlF$_6$), magnesium fluoride, and the like. A typical mirror has a DC resistance of greater than about $10^{10}$ ohms/cm$^2$. A preferred mirror comprises between about 5 and about 70 alternating layers of zinc sulfide and cryolite. The total thickness typically being between about 0.6 micrometers and about 6 micrometers and the reflectivity typically being at least about 90 percent of the impinging light have a wavelength between about 4,000 and about 7,500 angstroms. However, even the best mirrors do not effectively block all actinic radiation. The second dielectric mirror 6 may be made of the same or different materials than those used in first dielectric mirror 4. Similarly, second dielectric mirror 6 may have more, the same as, or fewer layers that the number of layers used in first dielectric mirror 4. For example, first dielectric mirror 4 may have 5 layers and second dielectric mirror 6 may have 37 layers or, conversely, first dielectric mirror 4 may have 37 layers and second dielectric mirror 6 may have 5 layers. Preferably, first dielectric mirror 4 is thicker than second dielectric mirror 6. Generally, thinner mirrors provide higher resolution. The light separating layer 5 comprises an organic dye, organic pigment or a semiconductor material selected from the group consisting of As, Se, Te, Bi, Sb, Ge, Si, S and alloys thereof. The combination of a light separating layer sandwiched between a first dielectric mirror and second dielectric mirror also prevents optical interference (optical coupling) and electrical shorting of the image pattern on the photoconductive layer and is capable of protecting light valves against against a broad spectrum of readout radiation.

If desired, an optional thin, electrically insulating layer of a film forming polymer may be applied between the light separating layer and the mirror and/or between the photoconductor layer and the adjacent transparent electrically conductive layer. Any suitable film forming polymer which does not trap charges may be utilized in these coatings. Typical film forming polymers include phenoxy resins, polyesters, polyurethanes, and the like. These optional coatings may be transparent or opaque for layers between the light separating layer and the mirror, but should be transparent between the photoconductor layer and the adjacent transparent electrically conductive layer. Generally, the optional film forming polymer layer is continuous and has a thickness between about 100 angstroms and about 20,000 Angstroms. The thin film forming polymer layer may be applied by any suitable technique. Typical techniques include dip coating, and the like. Drying of the deposited coating may be effected by any suitable conventional technique such as oven drying, infra red radiation drying, air drying and the like.

Any suitable light separating element comprising an organic dye, organic pigment or a semiconductor layer selected from the group consisting of As, Se, Te, Bi, Sb, Ge, Si, S and alloys thereof which absorbs radiation actinic to the photoconductor layer may be employed. The light separating element should be at least as electrically insulating as the photoconductor layer in the dark. The light separating element may comprise the organic dye, organic pigment, As, Se, Te, Bi, Sb, Ge, Si, S or alloy thereof alone or in combination with any suitable film forming binder. For optimum results, the amount of light transmitted through the light separating element is less than about 50 percent of the light incident on the first dielectric mirror.

Any suitable organic dye or organic pigment that absorbs actinic radiation to which the photoconductive layer is sensitive may be employed in the light separating layer. Typical dyes or pigments that absorb actinic radiation in the wavelength region to which the photoconductive layer is sensitive include cyanines perylenes, squarines, pyrroles, anthraquinones, and the like dyes or pigments. Generally, cyanine dyes and pigments are resonance hybrid materials in which both nitrogen atoms are members of heterocyclic ring systems containing the following substructures:

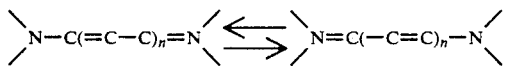

The heterocyclic nuclei are varied and can include, for example, quinoline, pyridine, thiazole, benzothiazole, benzoxazole, benzoselenazole, and the like. These cyanines are classified according to the value of n in the above formula. The dye is classified as a monomethine or simple cyanine when n equals zero because there is only one methine group between the heterocyclic nuclei. The dye is called a trimethine or carbocyanine if n=1 because there are three methine groups. Where n=2 or greater, the proper prefix is added to carbocyanine, e.g., a tricarbocyaine is a dye where n=3 and in which there are seven methine groups in the linkage between the heterocyclic nuclei. A typical simple cyanine is 1,1'-diethyl-2,2'-cyanine iodide. An example of a carbocyanine is Pinacyanol (Cl 808). Representative of a dicarbocyanine is 10-chloro-3,3'-diethyloxadicarbocyanine iodide. An example of a tricarbocyanine is 3,3'-diethylthiatricarbocyanine iodide. Still another example of a cyanine dye is DEOTC having the following structure:

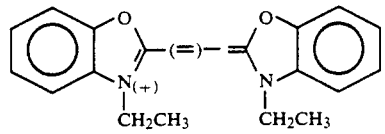

Still other cyanines include phthalocyanine pigments such as the X-form of metal free phthalocyanine, metal phthalocyanines such as vanadyl phthalocyanine, copper phthalocyanine, chloro aluminum phthalocyanine, titanyl phthalocyanine, magnesium phthalocyanine and the like. A preferred cyanine pigment is the metal phthalocyanine, vanadyl phthalocyanine, because it is easily deposited by vacuum deposition and has excellent absorption characteristics in the red region of the spectrum that is actinic to selenium arsenic photoconductor layers.

Additional examples of dyes or pigments absorbing light in the region to which the photoconductive layer is sensitive include oxazines such as Nile Blue having the following structure:

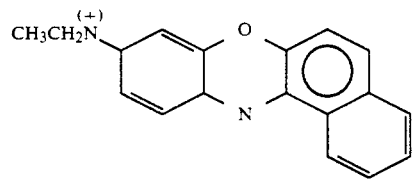

Still other organic dyes or pigments that absorb in the region to which the photoconductor layer is sensitive include benzimidazole perylene, bis(4-dimethylaminophenyl)squaraine, bis(2-hydroxy-4-dimethylaminophenyl)squaraine, 1,4,5,8-tetraaminoanthraquinone, 1,4-dithioketo-3,6-diphenyi-pyrrolo-[3,4-C]pyrrole and the like.

If desired, a mixture of dyes and or pigments may be used in the separating layer to broaden the wavelength range absorbed.

The thickness selected for the light separating layer depends on various factors such as the absorption coefficient of the dye or pigment, the intensity of the readout light, the sensitivity of the photoconductive material, the amount of light transmitted through the mirror and the like. Generally, for homogeneous or high dye or pigment concentrations, the dye or pigment layer preferably has a thickness of between about 2,000 angstroms and about 20,000 angstroms micrometers and absorbs light having a wavelength to which the photoconductor layer is sensitive. It is important that less actinic light from the read-out light reaches the imaging side of the photoconductor layer than the actinic light generated from imaging light source. When the thickness of the light separating layer is less than about 2,000 angstroms, the wavelengths to which the photoconductive layer is sensitive transmitted through the light separating layer tend to increase to an undesirable level. When the thickness of the light separating layer is greater than about 20,000 angstroms, resolution of the projected image becomes very poor and unacceptable. Where the dye or pigment light separating layer comprises a film forming binder in which the dye is dissolved or in which the pigment is dispersed, the concentration of the dye or pigment desired depends upon the thickness of the layer. More specifically, lower dye or pigment concentrations may be acceptable for thicker light separating layers whereas thinner layers require a higher concentration of dye or pigment in order to maintain the transmission range of the actinic radiation to less than about 50 percent and optimally less than about 0.001 percent of the light (to which the photoconductive layer is sensitive) that passes through the dielectric mirror. If the dye or pigment is employed with a film forming binder, the dye or pigment is preferably present in an amount of at least about 5 weight percent based on the total weight of the light separating layer to facilitate sufficient light separating of actinic radiation from the read-out light. Where pigment particles are dispersed in a film forming binder, the pigment particles preferably have an average particle size of less than about 5 micrometer. Larger particle sizes tend to reduce image resolution of the read-out image. Homogeneous evaporated vanadyl phthalocyanine layers between about 2,000 angstroms and 20,000 angstroms thick are particularly preferred. Any suitable polymeric film forming binder material which does not trap charges may be employed as the binder in the light separating layer. Typical organic polymeric film forming binders include thermoplastic and thermosetting resins such as polycarbonates, polyesters, polyamides, polyurethanes, polystyrenes, poiyarylethers, polyaryisulfones, polybutadienes, polysulfones, polyethersulfones, polyethylenes, polypropylenes, polyimides, polymethylpentenes, polyphenylene sulfides, polyvinyl acetate, polysiloxanes, polyacrylates, polyvinyl acetals, polyamides, polyimides, amino resins, phenylene oxide resins, terephthalic acid resins, phenoxy resins, epoxy resins, phenolic resins, polystyrene and acrylonitrile copolymers, polyvinylchloride, vinylchloride and vinyl acetate copolymers, acrylate copolymers, alkyd resins, cellulosic film formers, poly(amideimide), styrene-butadiene copolymers, vinylidenechloride-vinylchloride copolymers, vinylacetate-vinylidenechloride copolymers, styrene-alkyd resins, polyvinylcarbazole, and the like. These polymers may be block, random or alternating copolymers.

Any suitable and conventional technique may be utilized to mix and thereafter apply the light separating layer coating mixture. Typical application techniques include spraying, dip coating, roll coating, wire would rod coating, and the like. Drying of the deposited coating may be effected by any suitable conventional technique such as oven drying, infra red radiation drying, air drying and the like.

Substitution of a film of metals for the light separating layer materials of this invention would short out the image in the photoconductor layer and transparent films such as glass, quartz and the like, would optically couple the first and second dielectric mirrors and thus render the optical light valve ineffective.

The photoconductor layer 7 shown in the FIGURE may comprise any suitable inorganic photoconductive selenium, selenium alloy, or amorphous silicon material. The selenium photoconductor layer may be doped with between about 10 percent and about 90 percent by weight arsenic based on the total weight of the layer. When the proportion of arsenic exceeds about 90 percent, the amorphous photoconductive layer tends to become unstable and separate or crystallize. Generally, the thickness of the photoconductor layer is between about 1 micrometer and 30 micrometers. When the thickness is less than about 1 micrometer, the electric field is inadequate and poor images are obtained. Photoconductor layers having a thickness greater than about 30 microns are more susceptible to cracking. The photoconductor layer thickness is, in general, dictated by the absorption characteristics of the layer and the intensities of the imaging and read-out lights, and without being limited, falls typically in the range of between about 1 and about 30 micrometers. Arsenic-selenium alloy photoconductive materials are preferred because of their high coefficient of absorption with respect to actinic radiation which allows the use of greater read-out light intensities and therefore better reflected images. Typical arsenic-selenium photoconductive materials include amorphous arsenic triselenide or amorphous selenium alloyed with arsenic, tellurium, antimony, bismuth and the like. These arsenic-selenium photoconductive materials may be alloyed or doped with tellurium, antimony, bismuth, halogens, and the like. Members of the selenium-arsenic family comprising between about 20 and about 90 percent by weight arsenic based on the total weight of the photoconductor layer are particularly preferred, e.g. arsenic triselenide and selenium alloys highly doped with arsenic. Such photoconductor layers are preferably produced by conventional vacuum evaporation. Amorphous silicon photoconductive materials are well known and fabrication of layers thereof are described, for example in publications such as "Non Crystalline Semiconductors", Vol. I Ed. Michael Pollack, CRC Press Inc., Boca Raton, Fla. (1987) and "The Physics of a-Si:H Photoreceptors", D. M. Pai, SPSE Proceedings, The Fourth Int. Congress on Advances in Non-impact Printing Technologies, Mar. 20–25, 1988, New Orleans, USA, p. 41–53 (1988), the entire disclosure of these publications being incorporated herein by reference.

Any suitable voltage source may be utilized to supply the voltage to the two transparent electrodes. The voltage to be supplied is in the form of alternating waves such as a sine wave, square wave, HS modulator square wave or the like. The frequency of the applied alternating voltage is preferably between about 10 hertz and about 100 hertz for sine waves. When the frequency is greater than about 100 hertz the response of the photoreceptor decreases and the projected image becomes barely visible. Frequencies lower than about 10 hertz result in flicker. Generally, the applied voltage peak-to-peak is between about 1 volt and about 100 volts. A peak-to-peak voltage between about 3 and about 40 is preferred for best images. Voltages lower than about 1 volt peak-to-peak causes the image to disappear. Voltages exceeding threshold value tend to cause the image to change from positive to negative and later back to positive. The specific voltage selected depends to some extent on the specific liquid crystal layer materials, thickness and the specific photoconductor layer materials combination that are selected.

Any suitable image source light may be utilized. Typical well known image light sources include cathode ray tubes, scanning lasers, light emitting diode panels, liquid crystal display panels (e.g., liquid crystal televisions), plasma panels, electroluminescent panels, and the like. The image light source should generate sufficient light intensity at a wavelength range to which the photoconductor layer is sensitive to discharge the photoconductor layer in image configuration. Cathode ray tube images projected onto the photoconductor of light valves are preferred because of their flexibility, low cost and ready availability.

Any suitable read-out light source may be utilized. Preferably, the light source is a point source having a broad band continuous spectrum. Typical and conventional sources of broad band continuous spectrums include xenon lamps, zirconium lamps, quartz halogen lamps, and the like. Generally the broad band visible spectrum extends from about 4,500 angstroms to about 7,000 angstroms. Typical power outputs for the read-out light is between about 1 milliwatts/cm$^2$ and about 10 W/cm$^2$. The optimum amount of read-out light depends upon the specific application of the system, that is, the screen size and screen brightness desired.

Any suitable polarizer may be used between the light source and the light valve. Any suitable analyzer may be used between the light valve and the light screen. Polarizers and analyzers are conventional and commercially available. Typical examples include dichoic sheet polarizers, pellicle polarizers, beam splitting polarizers, and the like. Any suitable and conventional projection lenses may also be employed to focus the image and read-out lights.

Any suitable screen may be used to view the image reflected from the light valve. Typical screens are well known and commercially available. For special applications, the use of so called gain screens may be desirable. Such screens are brighter for given viewing directions. Gain may vary from about 1 to 10 or more.

DESCRIPTION OF THE PREFERRED EMBODIMENTS

A number of examples are set forth hereinbelow and are illustrative of different compositions and conditions that can be utilized in practicing the invention. All proportions are by weight unless otherwise indicated. It will be apparent, however, that the invention can be practiced with many types of compositions and can have many different uses in accordance with the disclosure above and as pointed out hereinafter.

EXAMPLE I

An optical light valve containing the sequence of layers shown in the FIGURE was constructed having an 8 micrometer thick vacuum evaporated photoconductive arsenic triselenide layer. A 0.5 mil thick liquid crystal electro-optic imaging medium layer was sandwiched between a substantially transparent electrically conductive indium tin oxide layer and a first dielectric mirror. The indium tin oxide layer was supported by a flat, square, transparent glass plate having a thickness of about 5.0 mm and a width of about 5.2 cm (2 inches). The liquid crystal layer was a mixture of nematic liquid crystals of positive dielectric anisotropy, available from EM Industries, Hawthorne, N.Y. A 1.0 micrometer thick vacuum deposited light separating layer alloy containing 10 percent by weight arsenic, 25 percent by weight tellurium and 65 percent by weight was formed between a first dielectric mirror layer and a second dielectric mirror. Each dielectric mirror was formed by alternately vapor depositing zinc sulfide and cryolite layers until a total of 37 layers were formed. The dielectric mirror layer side of the optical light valve closest to the liquid crystal layer was illuminated with a focused beam of a 1,000 W arc Xenon read-out light source having a power density of about 50 mw/cm$^2$. A linear polarizer was positioned between the Xenon read-out light source and the light valve. The light reflected from the light valve was passed through an analyzer, crossed with regard to the polarizer, and projected with a Kodak Ektamar Zoom lens onto a 3 by 3 foot reflective viewing screen. An image from a television set was projected through a Minolta 1:1.2 50 mm focusing lens onto the opposite side of the light valve. A clear moving image could be seen on the screen in reflection upon application across the indium tin oxide layers of about 10.0 volts peak to peak at a frequency of 32 cycles. The electro-optic effect is the twisted nematic effect.

EXAMPLE II

An optical light valve was constructed with substantially identical layers as those described in Example I, except that the second dielectric mirror (sandwiched between the light separating layer and the photoconductive layer) contained only 5 alternating layers of zinc sulfide and cryolite. This light valve was tested as described in Example I. The moving image on the screen exhibited improved resolution compared to the moving image observed in Example I test.

EXAMPLE III

An optical light valve was constructed with substantially identical layers as those described in Example II, except that the first dielectric mirror (sandwiched between the light separating layer and the photoconductive layer) contained 55 alternating layers of zinc sulfide and cryolite. This light valve was tested as described in Example I. Improved reflectivity for the optical light valve of this Example was observed compared to the reflectivity exhibited by the optical light valves of Examples I and II.

Although the invention has been described with reference to specific preferred embodiments, it is not intended to be limited thereto, rather those skilled in the art will recognize that variations and modifications may be made therein which are within the spirit of the invention and within the scope of the claims.

What is claimed is:

1. A light valve comprising a first transparent electrically insulating layer, a first transparent electrically conductive layer, an electro-optic imaging medium layer, a first dielectric mirror, a light separating layer comprising an organic dye, organic pigment, or semiconductor selected from the group consisting of As, Se, Te, Bi, Sb, Ge, Si, S or alloys thereof, a second dielectric mirror, a photoconductor layer selected from the group consisting of selenium, selenium alloys and amorphous silicon, a second transparent electrically conductive layer and a second transparent layer, wherein said separating layer absorbs radiation to said photoconductor layer and wherein said separating layer is at least as electrically insulating as said photoconductor layer in the absence of radiation actinic to said photoconductor layer.

2. A light valve according to claim 1 wherein said photoconductor layer comprises selenium and arsenic.

3. A light valve according to claim 2 wherein said photoconductor layer comprises arsenic triselenide.

4. A light valve according to claim 1 wherein said photoconductor layer comprises silicon.

5. A light valve according to claim 1 wherein said photoconductor layer comprises amorphous selenium.

6. A light valve according to claim 1 wherein said separating layer comprising said organic dye or organic pigment comprises a cyanine dye or pigment.

7. A light valve according to claim 6 wherein said cyanine dye or pigment is a metal phthalocyanine.

8. A light valve according to claim 6 wherein said separating layer comprises a homogeneous vacuum evaporated vanadyl phthalocyanine light absorption layer.

9. A light valve according to claim 1 wherein said separating layer comprising said organic dye or organic pigment also comprises a film forming polymer, 10. A light valve according to claim 1 wherein said separating layer comprises a semiconductor selected from the group consisting of As, Se, Te, Bi, Sb, Ge, Si, S and alloys thereof.

11. A light valve according to claim 1 wherein said electro-optic imaging medium layer comprises a nematic liquid crystal composition.

12. A light valve according to claim 1 wherein said electro-optic imaging medium layer comprises a cholesteric liquid crystal composition.

13. A light valve according to claim 1 wherein said electro-optic imaging medium layer comprises a smectic liquid crystal composition.

14. A light valve according to claim 1 wherein said electro-optic imaging medium layer comprises a ferroelectric liquid crystal composition.

15. A light valve according to claim 1 wherein said electro-optic imaging medium layer comprises a polymer encapsulated liquid crystal composition.

16. A light valve according to of claim 1 wherein said first dielectric mirror reflects at least about 90 percent of impinging read-out light having a wavelength actinic to said photoconductor layer.

17. A light valve according to of claim 1 wherein said separating layer has a thickness of between about 2,000 and about 20,000 angstroms.

18. Imaging apparatus comprising:
a. light valve comprising a first transparent electrically insulating layer, a first transparent electrically conductive layer, an electro-optic imaging medium layer, a first dielectric mirror, a light separating layer comprising an organic dye, organic pigment, or semiconductor layer selected from the group consisting of As, Se, Te, Bi, Sb, Ge, Si, S or alloys thereof, a second dielectric mirror, a photoconductor layer selected from the group consisting of selenium, selenium alloys and silicon which is sensitive to actinic radiation, a second transparent electrically conductive layer and a second transparent layer, wherein said separating element absorbs actinic radiation comprising wavelengths between about 4000 angstroms and about 7,000 angstroms and wherein said separating layer is at least as electrically insulating as said photoconductor layer in the dark;
b. means for applying an alternating voltage between said first transparent electrically conductive layer and said second electrically conductive layer;
c. means for illuminating said light valve from said second transparent layer side with actinic radiation in imagewise configuration; and
d. means for uniformly illuminating said light valve from said first transparent electrically insulating layer side with broad band radiation which includes actinic radiation having a wavelength between about 4000 angstroms and about 7,500 angstroms; said light separating layer having a thickness and coefficient of absorption for said actinic radiation sufficient to maintain the transmission of said actinic radiation through said separating layer to less than about 50 percent upon activation of said means for uniformly illuminating said device.

* * * * *